US009496822B2

(12) United States Patent
Gerwing

(10) Patent No.: US 9,496,822 B2
(45) Date of Patent: Nov. 15, 2016

(54) HURRICANE PROOF SOLAR TRACKER

(71) Applicant: LOCKHEED MARTIN CORPORATION, Bethesda, MD (US)

(72) Inventor: David H. Gerwing, Kanata (CA)

(73) Assignee: Lockheed Martin Corporation, Bethesda, MD (US)

( * ) Notice: Subject to any disclaimer, the term of this patent is extended or adjusted under 35 U.S.C. 154(b) by 104 days.

(21) Appl. No.: 14/029,860

(22) Filed: Sep. 18, 2013

(65) Prior Publication Data

US 2014/0083480 A1    Mar. 27, 2014

Related U.S. Application Data

(60) Provisional application No. 61/704,646, filed on Sep. 24, 2012.

(51) Int. Cl.
| | | |
|---|---|---|
| *H02S 40/00* | (2014.01) | |
| *H02S 20/00* | (2014.01) | |
| *H02S 20/32* | (2014.01) | |
| *F24J 2/46* | (2006.01) | |
| *F24J 2/54* | (2006.01) | |
| *H01L 31/042* | (2014.01) | |

(52) U.S. Cl.
CPC .............. *H02S 40/00* (2013.01); *F24J 2/4638* (2013.01); *F24J 2/5427* (2013.01); *H02S 20/00* (2013.01); *H02S 20/32* (2014.12); *F24J 2002/5451* (2013.01); *Y02E 10/47* (2013.01); *Y02E 10/50* (2013.01)

(58) Field of Classification Search
None
See application file for complete search history.

(56) References Cited

U.S. PATENT DOCUMENTS

| | | | |
|---|---|---|---|
| 3,295,512 A | | 1/1967 | McCusker |
| 4,167,936 A | | 9/1979 | Hackworth |
| 4,225,781 A | | 9/1980 | Hammons |
| 4,274,712 A | * | 6/1981 | Sintes ........................... 359/850 |
| 4,429,178 A | | 1/1984 | Prideaux et al. |
| 4,476,853 A | * | 10/1984 | Arbogast ...................... 126/578 |
| 4,649,899 A | | 3/1987 | Moore |
| 4,870,949 A | | 10/1989 | Butler |
| 4,883,340 A | | 11/1989 | Dominguez |
| 4,968,355 A | | 11/1990 | Johnson |
| 5,325,844 A | | 7/1994 | Rogers et al. |
| 5,349,245 A | | 9/1994 | Hughes et al. |
| 5,374,317 A | | 12/1994 | Lamb et al. |
| 5,379,596 A | | 1/1995 | Grayson |

(Continued)

FOREIGN PATENT DOCUMENTS

| | | | |
|---|---|---|---|
| FR | 2461331 A | * | 3/1981 |
| FR | 2535033 A | * | 4/1984 |

OTHER PUBLICATIONS

Definition of trunnion [retrieved online at http://www.collinsdictionary.com/dictionary/english/trunnion on Jul. 18, 2015].*

(Continued)

*Primary Examiner* — Eric R Smith
(74) *Attorney, Agent, or Firm* — Withrow & Terranova, P.L.L.C.

(57) ABSTRACT

A hurricane-proof solar tracker and related method of operation includes a solar panel array assembly having one end coupled to a ballast and a tilting assembly supporting a solar panel assembly. The tilting assembly tilts the solar panel array assembly to track with the sun in a first position, and retracts the solar panel array to a substantially flat second position.

8 Claims, 15 Drawing Sheets

(56) References Cited

U.S. PATENT DOCUMENTS

| | | | |
|---|---|---|---|
| 5,520,747 A | 5/1996 | Marks | 136/245 |
| 5,622,078 A | 4/1997 | Mattson | |
| 5,969,501 A | 10/1999 | Glidden et al. | |
| 6,058,930 A | 5/2000 | Shingleton | 126/600 |
| 6,123,067 A | 9/2000 | Warrick | |
| 6,302,099 B1 | 10/2001 | McDermott | |
| 6,563,040 B2 | 5/2003 | Hayden et al. | |
| 6,722,357 B2 | 4/2004 | Shingleton | |
| 6,958,868 B1 | 10/2005 | Pender | |
| 7,240,674 B2 | 7/2007 | Patterson | |
| 7,430,077 B2 | 9/2008 | Briee et al. | |
| D586,737 S | 2/2009 | Shugar et al. | |
| 7,531,741 B1 | 5/2009 | Melton et al. | |
| 7,557,292 B2 | 7/2009 | Shingleton et al. | |
| 7,607,427 B2 | 10/2009 | Yi et al. | |
| 7,647,924 B2 | 1/2010 | Hayden | |
| 7,677,242 B2 | 3/2010 | Carcangiu et al. | |
| 7,795,568 B2 | 9/2010 | Sherman | |
| 7,832,001 B2 | 11/2010 | Noble | |
| 7,836,879 B2 | 11/2010 | Mackamul | |
| 7,872,192 B1 | 1/2011 | Fraas et al. | |
| D640,972 S | 7/2011 | Fiero | |
| 7,971,587 B2 | 7/2011 | Gee et al. | |
| 8,119,963 B2 | 2/2012 | Scanlon | |
| 8,459,249 B2 | 6/2013 | Corio | 126/600 |
| 8,492,645 B1* | 7/2013 | Strahm | 136/244 |
| 2004/0124711 A1* | 7/2004 | Muchow et al. | 307/64 |
| 2005/0051209 A1 | 3/2005 | Choe | |
| 2006/0054162 A1 | 3/2006 | Romeo | |
| 2007/0153227 A1 | 7/2007 | Duston et al. | |
| 2007/0215199 A1* | 9/2007 | Dold et al. | 136/246 |
| 2008/0128187 A1 | 6/2008 | Hu | |
| 2008/0163921 A1 | 7/2008 | Leong et al. | |
| 2008/0230047 A1 | 9/2008 | Shugar et al. | |
| 2008/0271776 A1 | 11/2008 | Morgan | |
| 2008/0308091 A1 | 12/2008 | Corio | |
| 2008/0308154 A1 | 12/2008 | Cart et al. | |
| 2009/0014054 A1 | 1/2009 | Cano Messeguer et al. | |
| 2009/0032014 A1 | 2/2009 | Meydbray | 126/608 |
| 2009/0032089 A1 | 2/2009 | Chen et al. | |
| 2009/0050191 A1 | 2/2009 | Young et al. | 136/246 |
| 2009/0188546 A1 | 7/2009 | McGlynn et al. | |
| 2009/0250095 A1 | 10/2009 | Thorley et al. | |
| 2009/0260316 A1 | 10/2009 | Jones et al. | |
| 2009/0293861 A1 | 12/2009 | Taylor et al. | |
| 2009/0314325 A1 | 12/2009 | Borton | |
| 2010/0000519 A1 | 1/2010 | Zalusky et al. | |
| 2010/0000592 A1 | 1/2010 | Ko | |
| 2010/0024861 A1 | 2/2010 | Cabanillas Saldana | |
| 2010/0043866 A1 | 2/2010 | Magan De La Rocha | |
| 2010/0071684 A1* | 3/2010 | Cowan et al. | 126/605 |
| 2010/0095955 A1* | 4/2010 | Carrasco Martinez | F24J 2/5424 126/601 |
| 2010/0101625 A1* | 4/2010 | Kats et al. | 136/244 |
| 2010/0126554 A1 | 5/2010 | Morgan et al. | |
| 2010/0139647 A1* | 6/2010 | Silvestre Mata | 126/604 |
| 2010/0139731 A1 | 6/2010 | Almy | |
| 2010/0154780 A1 | 6/2010 | Linke | |
| 2010/0180884 A1 | 7/2010 | Oosting | 126/574 |
| 2010/0223865 A1 | 9/2010 | Gonzalez Moreno | |
| 2010/0258110 A1 | 10/2010 | Krabbe et al. | |
| 2010/0263710 A1 | 10/2010 | Gonzalez Moreno | |
| 2010/0275972 A1 | 11/2010 | Benitez et al. | |
| 2010/0281793 A1 | 11/2010 | McPheeters et al. | |
| 2010/0282315 A1 | 11/2010 | Gilbert | |
| 2010/0282418 A1 | 11/2010 | Lucas | 160/54 |
| 2010/0288062 A1 | 11/2010 | Meyer | |
| 2010/0294265 A1* | 11/2010 | Baer et al. | 126/680 |
| 2010/0326427 A1 | 12/2010 | Chen | |
| 2011/0005573 A1 | 1/2011 | Chang et al. | 136/245 |
| 2011/0005577 A1 | 1/2011 | Medina et al. | |
| 2011/0017276 A1 | 1/2011 | Boffa et al. | |
| 2011/0056484 A1 | 3/2011 | Rogers | |
| 2011/0061644 A1 | 3/2011 | Pizzarello et al. | |
| 2011/0114153 A1 | 5/2011 | Almy et al. | |
| 2011/0120447 A1 | 5/2011 | Sobolewski et al. | |
| 2011/0162691 A1 | 7/2011 | Hartelius | |
| 2011/0179791 A1* | 7/2011 | Butler et al. | 60/641.15 |
| 2011/0186040 A1 | 8/2011 | Liao | |
| 2011/0240006 A1* | 10/2011 | Linke | F24J 2/541 126/600 |
| 2011/0253193 A1 | 10/2011 | Korman et al. | 136/245 |
| 2012/0285506 A1* | 11/2012 | Kuo | 136/246 |
| 2013/0186450 A1 | 7/2013 | Smith et al. | |
| 2013/0199594 A1* | 8/2013 | Guha et al. | 136/246 |

OTHER PUBLICATIONS

Definition of ballast [retrieved online at http://www.collinsdictionary.com/dictionary/american/ballast?showCookiePolicy=true on Jul. 18, 2015].*

Definition of telescope [retrieved online at http://www.collinsdictionary.com/dictionary/american/telescope?showCookiePolicy=true on Jul. 18, 2015].*

Machine translation of FR2461331A.*

Machine translation of FR2535033A.*

Definition of flange [retrieved from internet at http://www.collinsdictionary.com/dictionary/american/flange?showCookiePolicy=true on Jul. 20, 2015].*

Sunpower Corporation, Sunpower T20 Tracker Data Sheet, Oct. 2009.

Heindl Server GmbH, Voltwerk VT News Release, Dec. 2008.

Deger Energie, Deger TOPtracker 40NT Data Sheet, Jan. 2013.

Derger Energie, Deger tracker 3000HD Data Sheet, Jan. 2013.

Non-Final Office Action for U.S. Appl. No. 13/925,936, mailed Nov. 20, 2015, 16 pages.

Final Office Action for U.S. Appl. No. 13/925,936, mailed Jul. 1, 2016, 18 pages.

* cited by examiner

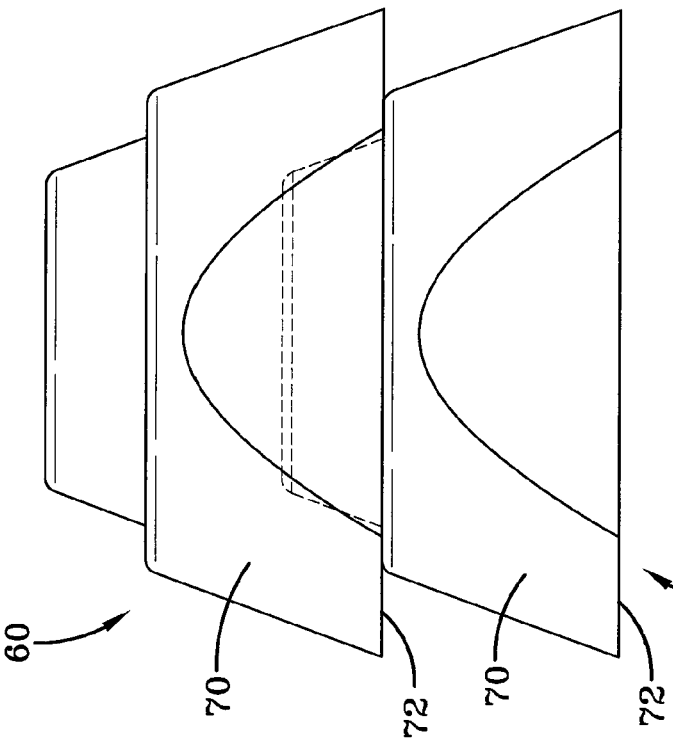
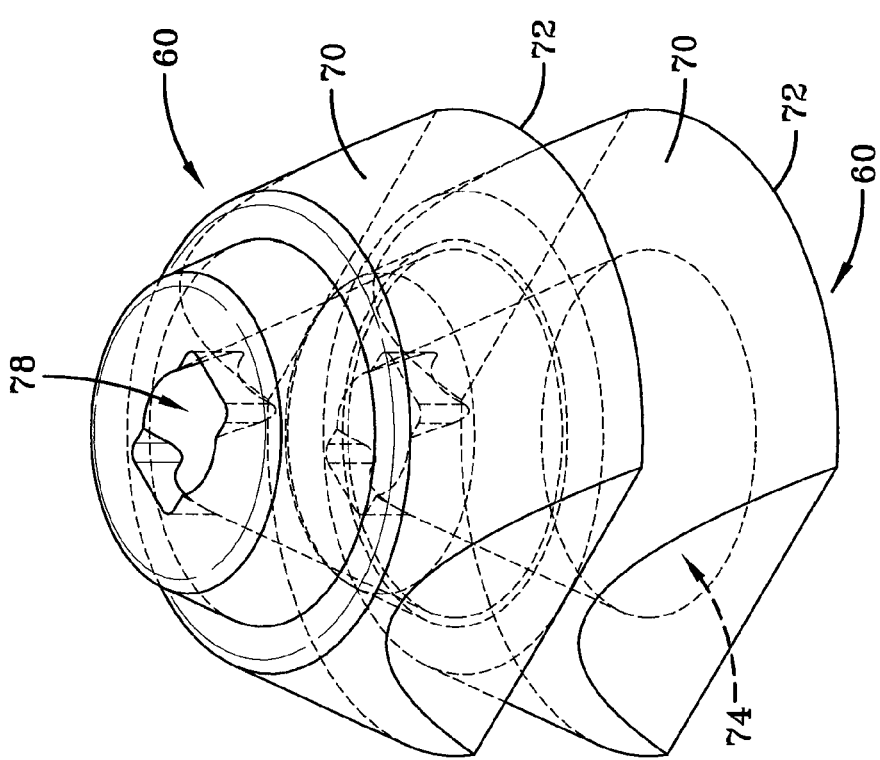
FIG-9B
FIG-9A

US 9,496,822 B2

HURRICANE PROOF SOLAR TRACKER

CROSS-REFERENCE TO RELATED APPLICATION

This application claims priority of U.S. Provisional Application Ser. No. 61/704,646 filed Sep. 24, 2012, which is incorporated herein by reference.

TECHNICAL FIELD

Generally, the present invention is directed to a solar tracker system. Specifically, the present invention is directed to a hurricane proof solar tracker system wherein the system deploys in a first operational position to tilt and track with movement of the sun and which is movable to a second storage position that is substantially flat and horizontal in high wind conditions.

BACKGROUND ART

In view of the continuing need for renewable energy resources, solar energy is one of the primary areas of focus. Solar energy provides an abundant and readily renewable energy source without the harmful carbon emissions that are characteristic of oil, coal and natural gas. Improvements in solar panel efficiency—the panel's ability to convert more solar energy into kilowatt-hours—and in the cost of constructing the panels are making solar energy a viable alternative energy source.

It is currently known to utilize solar panel assemblies and sun-tracking systems to follow the sun's trajectory to maximize energy generation throughout the day. It is also known that tracking the sun with a solar panel assembly on one axis improves the energy capture of the solar panels by up to 25%.

It is also known to provide a one-axis tilted array which enhances solar exposure to improve energy capture. Moreover, adding a second axis of tilt to the solar panel assemblies is believed to add up to another 15% energy output. For utility scale installations this is a significant improvement. Current solar panel mounting systems are designed to withstand winds up to 100 mph. Areas with high hurricane activity require structures and panels to withstand winds up to 160 mph, that is, about 2.6 times the wind force. Accordingly, hurricane solar mounts are very expensive and still leave the glass solar panels prone to damage from flying horizontal debris. Moreover, it is known that due to the atmospheric boundary effect, winds close to the ground are much lower in speed than those even a few meters higher. As such, there is a need in the art to provide a reliable system so as to move the solar panels to a position that minimizes damage thereto in high wind conditions.

SUMMARY OF THE INVENTION

In light of the foregoing, it is a first aspect of the present invention to provide a hurricane proof solar tracker.

It is another aspect of the present invention to provide a hurricane-proof solar tracker, comprising a solar panel array assembly having one end coupled to a ballast, and a tilting assembly supporting the solar panel assembly, the tilting assembly tilting the solar panel array assembly to track with the sun in a first position, and retracting the solar panel array to a substantially flat second position.

Yet another aspect of the present invention is to provide a method of operating a hurricane proof solar tracker, comprising coupling one end of a solar panel array assembly to a ballast, supporting the solar panel array assembly in an operational position to track the sun's trajectory during normal operation, and retracting the solar panel array assembly to a substantially flat position upon detection of a potentially damaging event.

BRIEF DESCRIPTION OF THE DRAWINGS

These and other features and advantages of the present invention will become better understood with regard to the following description, appended claims, and accompanying drawings wherein:

FIG. 9A is a perspective view showing the ballast blocks stacked on top of one another and FIG. 9B is an elevational view for shipping according to another concept of the present invention;

BEST MODE FOR CARRYING OUT THE INVENTION

Figure 1:
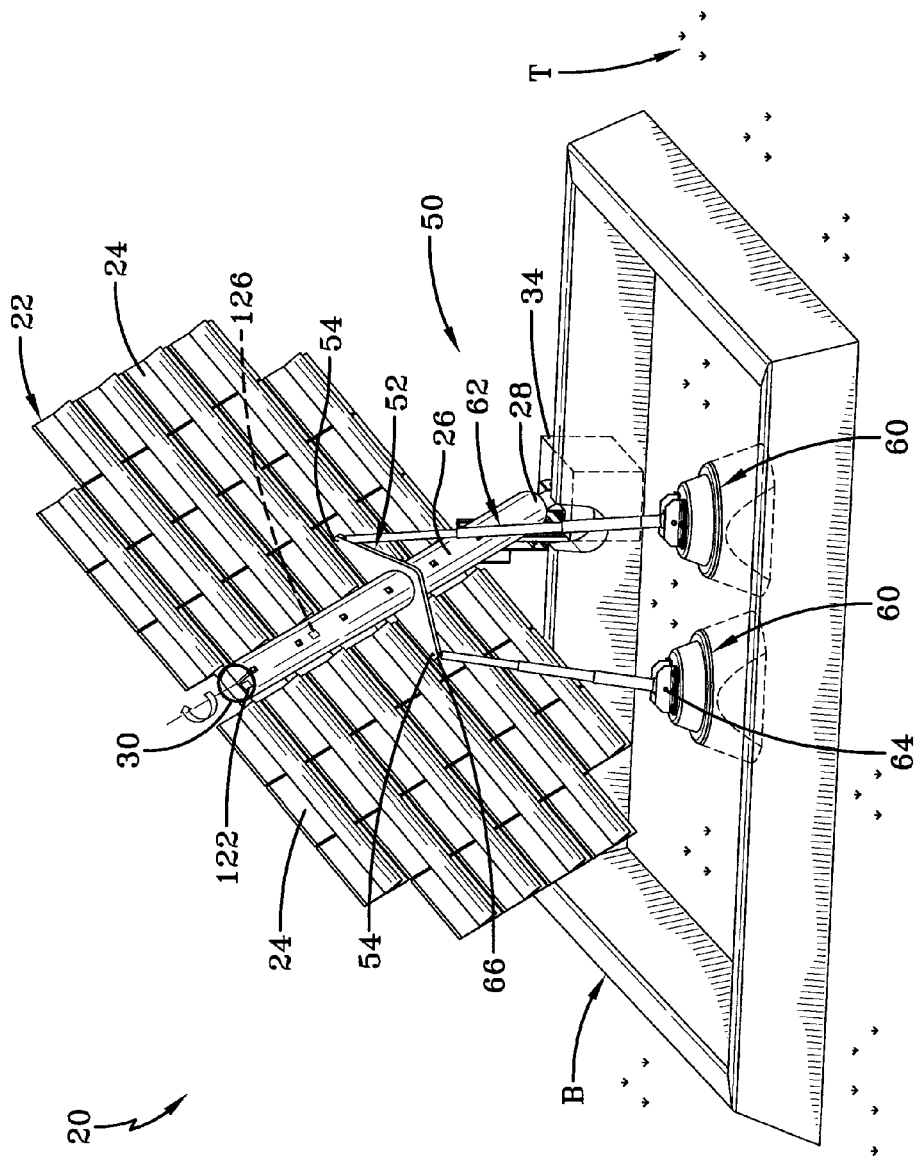
FIG. 1 is an underside perspective view of a hurricane proof solar tracker according to the concepts of the present invention.
Figure 2:
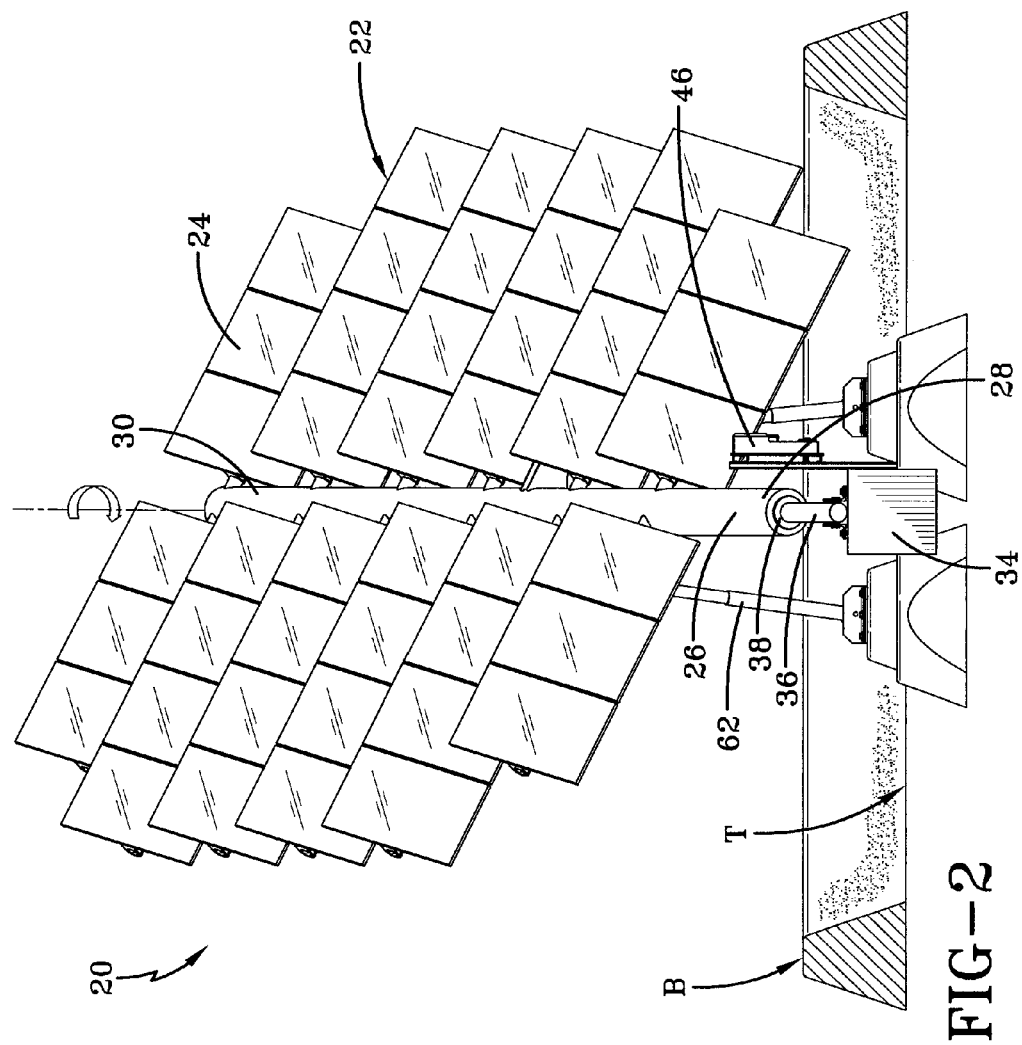
FIG. 2 is an elevation end view of the solar tracker in its operational position according to the concepts of the present invention.
Figure 3:
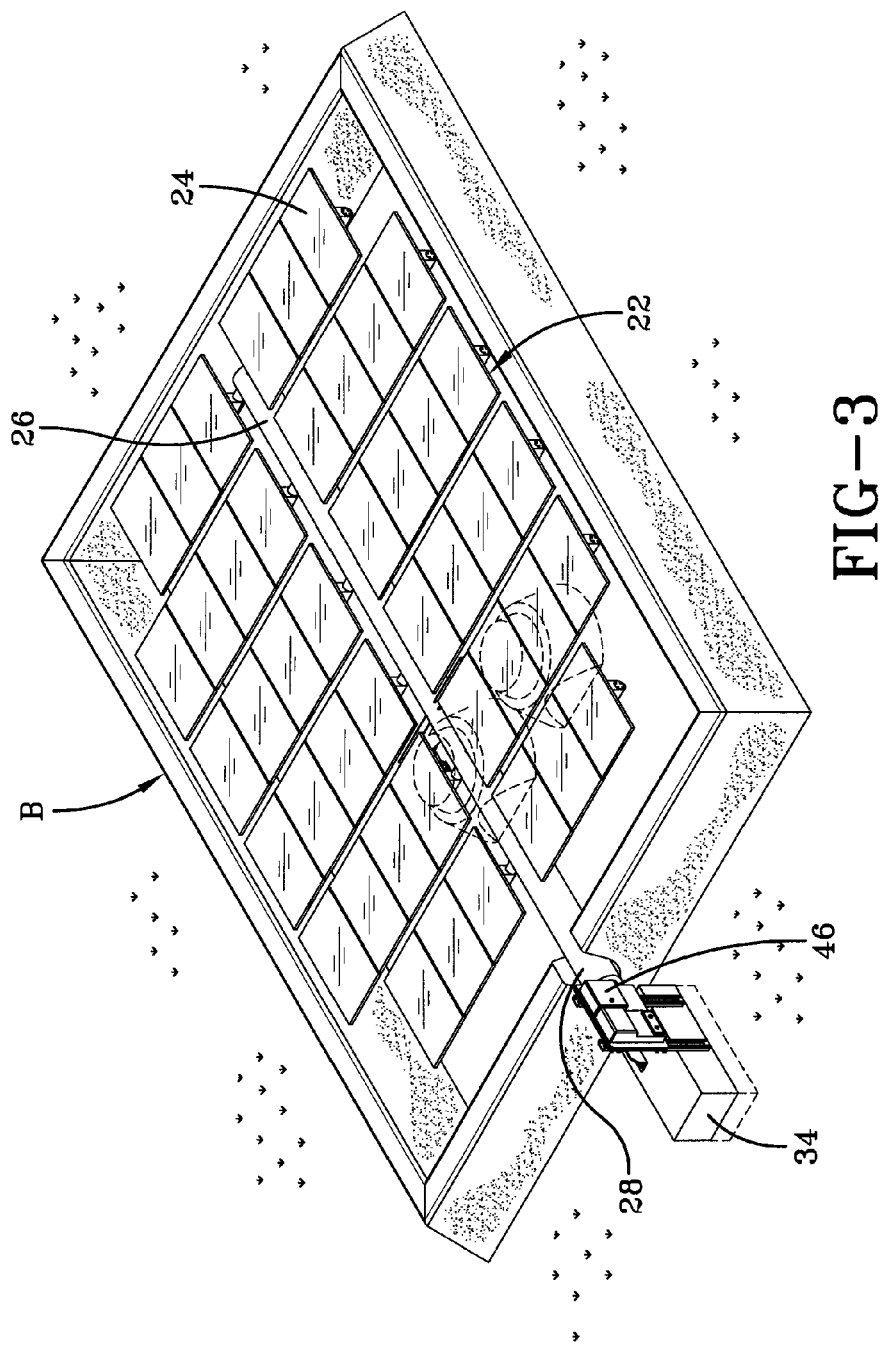
FIG. 3 is a top perspective view of the solar tracker in a lay-down hurricane position.
Figure 4:
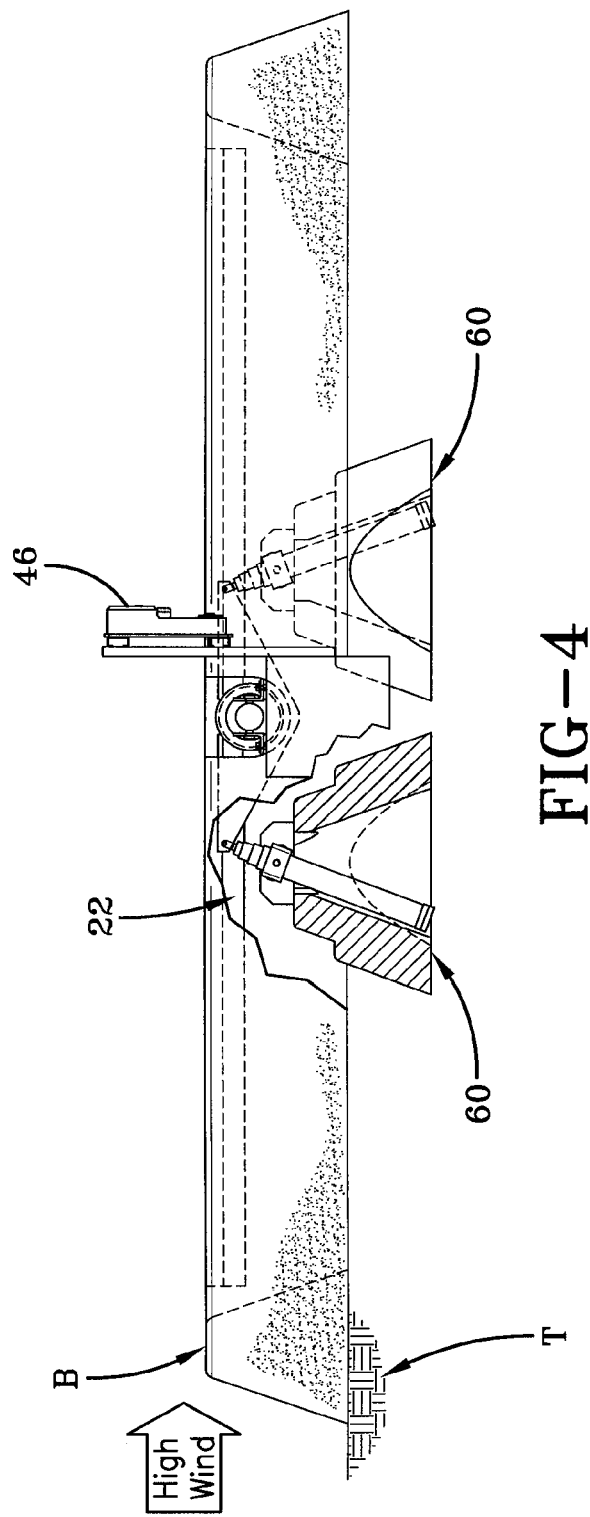
FIG. 4 is an elevation view of the solar tracker in a lay-down position.
Figure 5:
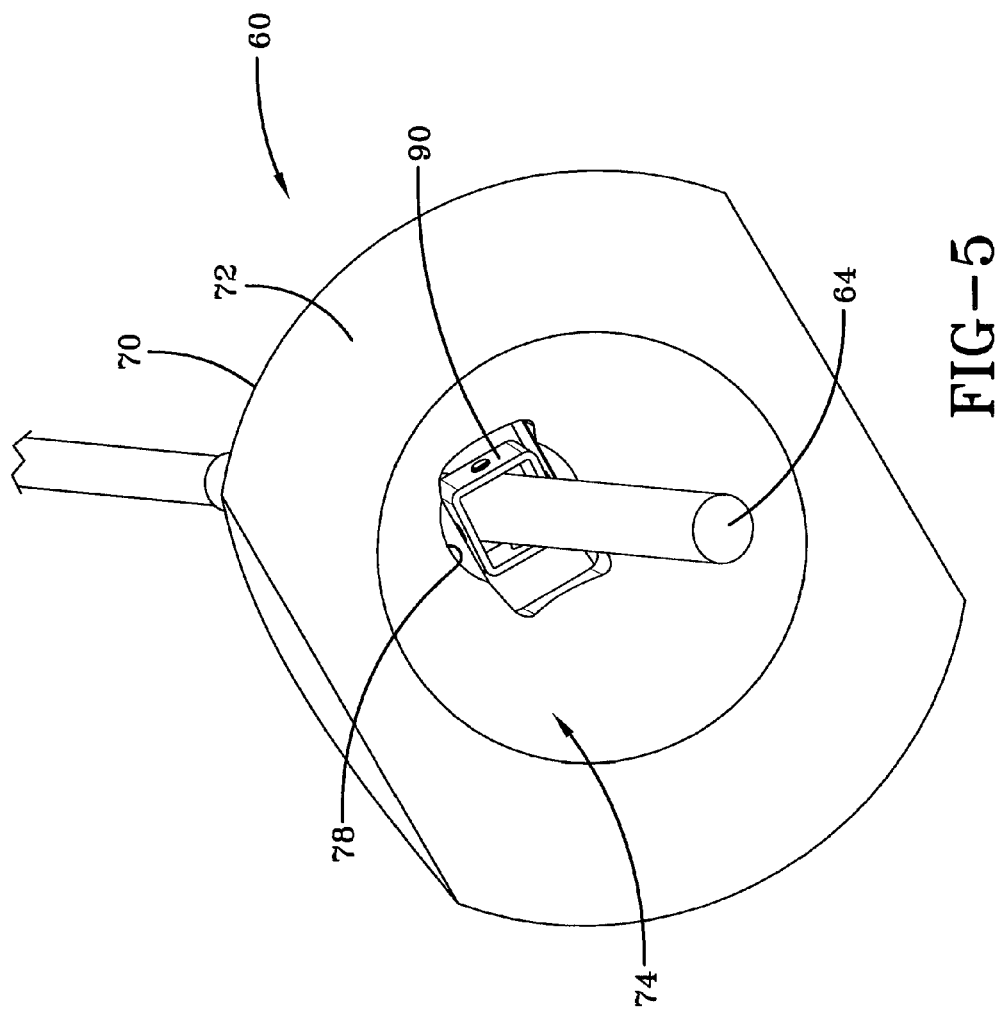
FIG. 5 is an underside perspective view of a trunnion mount actuator and ballast block utilized with the solar tracker according to the concepts of the present invention.

Referring now to the drawings and in particular to FIGS. 1-4, it can be seen that a single axis hurricane proof solar tracker is designated generally by the numeral 20. The tracker 20 is installed on terrain designated by the letter T wherein the outer periphery of the tracker is surrounded by a berm designated by the letter B. As best seen in FIGS. 1 and 2, the tracker is shown in an extended or operating position and in FIGS. 3 and 4 the tracker is shown in a lay-down hurricane position, wherein the outer periphery of the tracker is surrounded by the berm so that high wind conditions are deflected by the berm so as to prevent horizontal flying debris from damaging the solar tracker as will be described. The lay-down hurricane position may also be referred to as a storage position or a retracted position. Moreover, the berm B is typically constructed of an aggregate material such as dirt, rocks, boulders and the like wherein vegetation may be provided as long as it does not interfere with the solar energy collection or movement of the tracker. Instead of aggregate, some embodiments may employ concrete or other structural building materials. As will become apparent, the height of the berm is at least level with or slightly higher than the height of solar panel arrays used by the tracker in its lay-down position. In some embodiments the berm may be lower than the height of the solar panel assembly.

The tracker 20 includes a solar panel array assembly designated generally by the numeral 22. The assembly 22 includes a plurality of solar panels 24 that are mounted to a rotatable and substantially hollow spine 26. The spine includes a pivot end 28 which is opposite a sensor end 30. The pivot end 28 is mounted and coupled to a ballast block 34 which is predominantly buried and anchored in the ground or terrain T. A shaft 36 extends from the ballast block 34 and is coupled to the pivot end 28 of the spine 26. Bushings 38 are provided between the shaft and the interior of the spine 26 so as to allow for rotatable movement of the spine 26 as will be described. The shaft 36 may be pivotably mounted to the block 34 to allow angular movement of the spine.

A control panel 46 is associated with the ballast block and may be utilized to control various mechanical, electrical and/or hydraulic components of the tracker 20. In other words, various types of inputs are received and outputs generated by the control panel 46 to control operation of the tracker 20.

A tilting assembly designated generally by the numeral 50 is utilized to move the tracker and, in particular, the array assembly 22 between an operational position, also referred to as a working and tilting position, to a lay-down hurricane position. The tilting assembly 50 also supports the array assembly 22 as it tracks movement of the sun. The tilting assembly 50 may include a wing flange 52 which is mounted on the spine 26. In most embodiments the wing flange 52 is mounted in a position away from the ballast block to optimally support the weight of the array assembly and also to optimize the rotatable movement of the spine 26 and the tilting movement of the array assembly 22. The wing flange 52 provides for a pair of opposed mounting sockets 54 at opposite sides of the flange. A pair of ballast blocks 60 are predominantly buried or anchored in the terrain and are positioned relatively close to the mounting sockets 54 of the wing flange 52 when the spine is in a horizontal lay-down position. A telescoping cylinder 62 may be mounted or otherwise coupled between each of the respective ballast blocks 60 and mounting sockets 54. The telescoping cylinder 62 includes a base end 64 coupled to the ballast block 60 and a socket end 66 coupled to the respective mounting socket 54. As used herein, the term telescoping or telescopic is used to mean that the cylinder 62 consists of components that fit and slide one within another. Skilled artisans will appreciate that the components are not required to be cylindrical, although the cylindrical form is the one most likely to be used. In any event, it is believed that any device which can expand and collapse in a controlled manner is suitable for use as a telescoping cylinder.

As best seen in FIGS. 5-8, 9A and 9B, the ballast block 60 is a conical configuration which has a base 70, wherein a portion of the base is buried in the terrain or otherwise anchored. The base 70 includes a bottom surface 72 from which a hollow cavity 74 extends into the base 70. The base provides a mounting surface 76 that is opposite the bottom surface 72. Extending between the surfaces 72, 76 is an opening 78 that is contiguous with the cavity 74. With this configuration it will be appreciated that the ballast blocks are stackable on top of one another for efficient shipping as best seen in FIGS. 9A and 9B. In other words, the conical top portion of the base 70 is receivable within the hollow cavity 74 of an adjacent ballast block 60.

Figure 6:
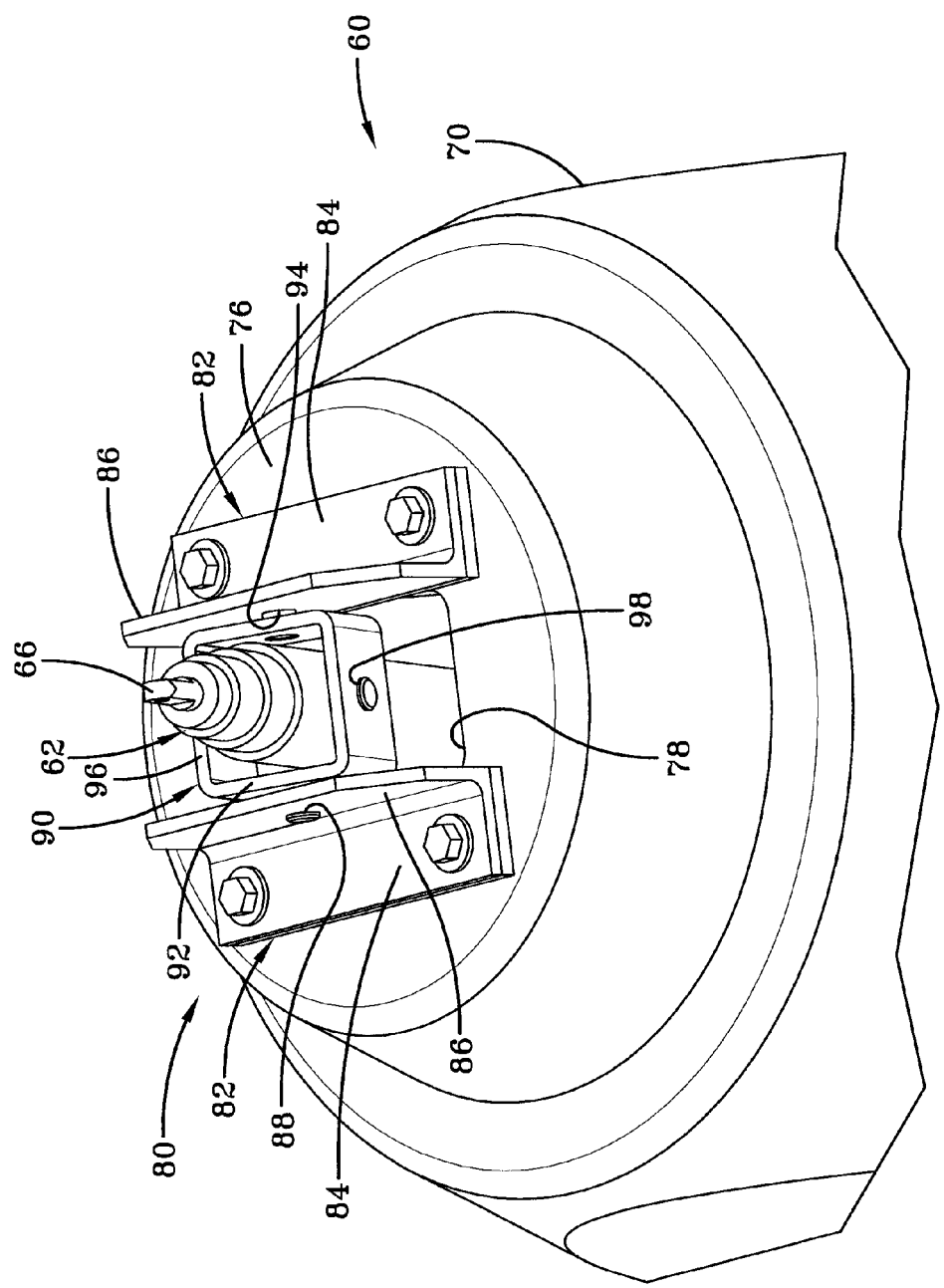
FIG. 6 is a perspective view of the trunnion mount in the lay down position according to the concepts of the present invention.
Figure 7:
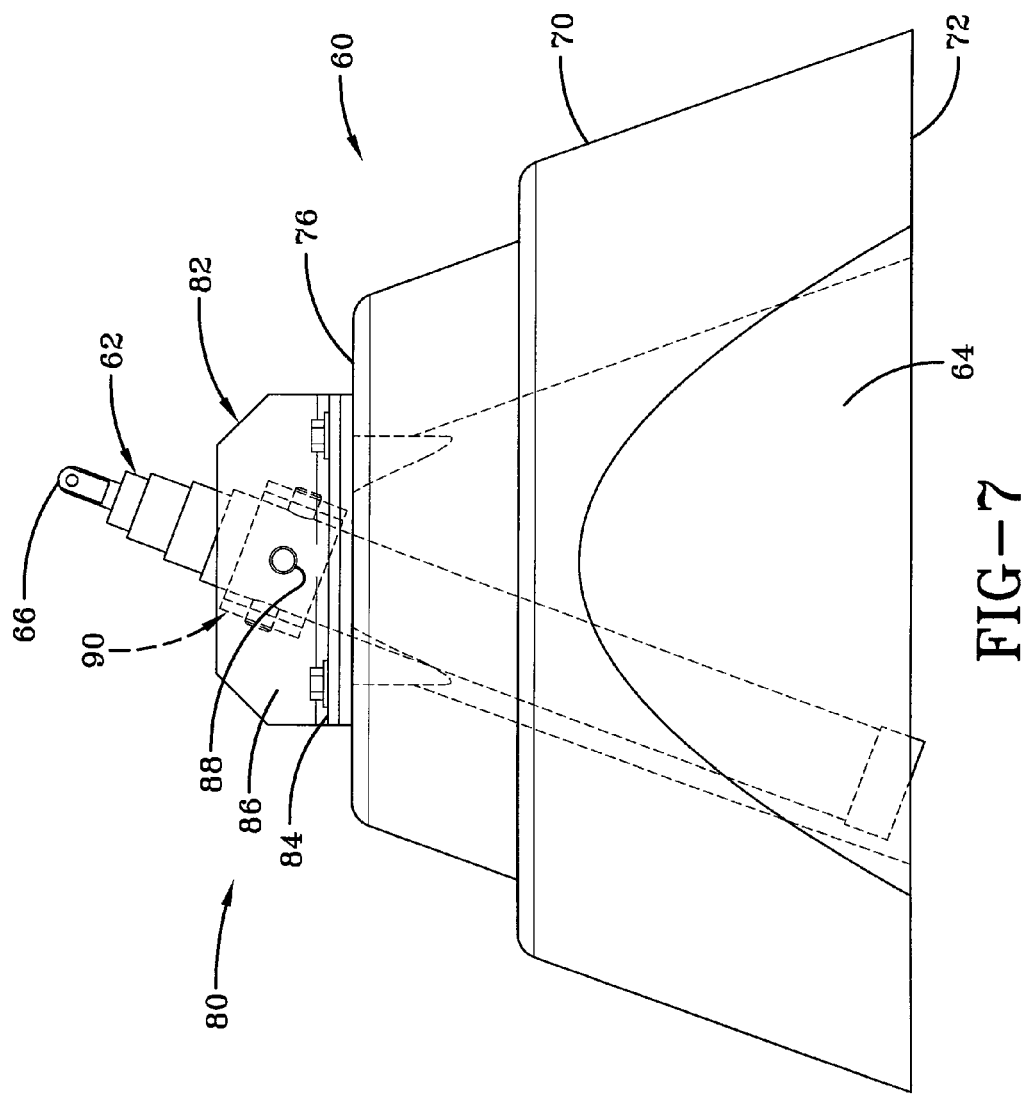
FIG. 7 is an elevation view of the trunnion mount with a telescoping cylinder in the lay-down position.
Figure 8:
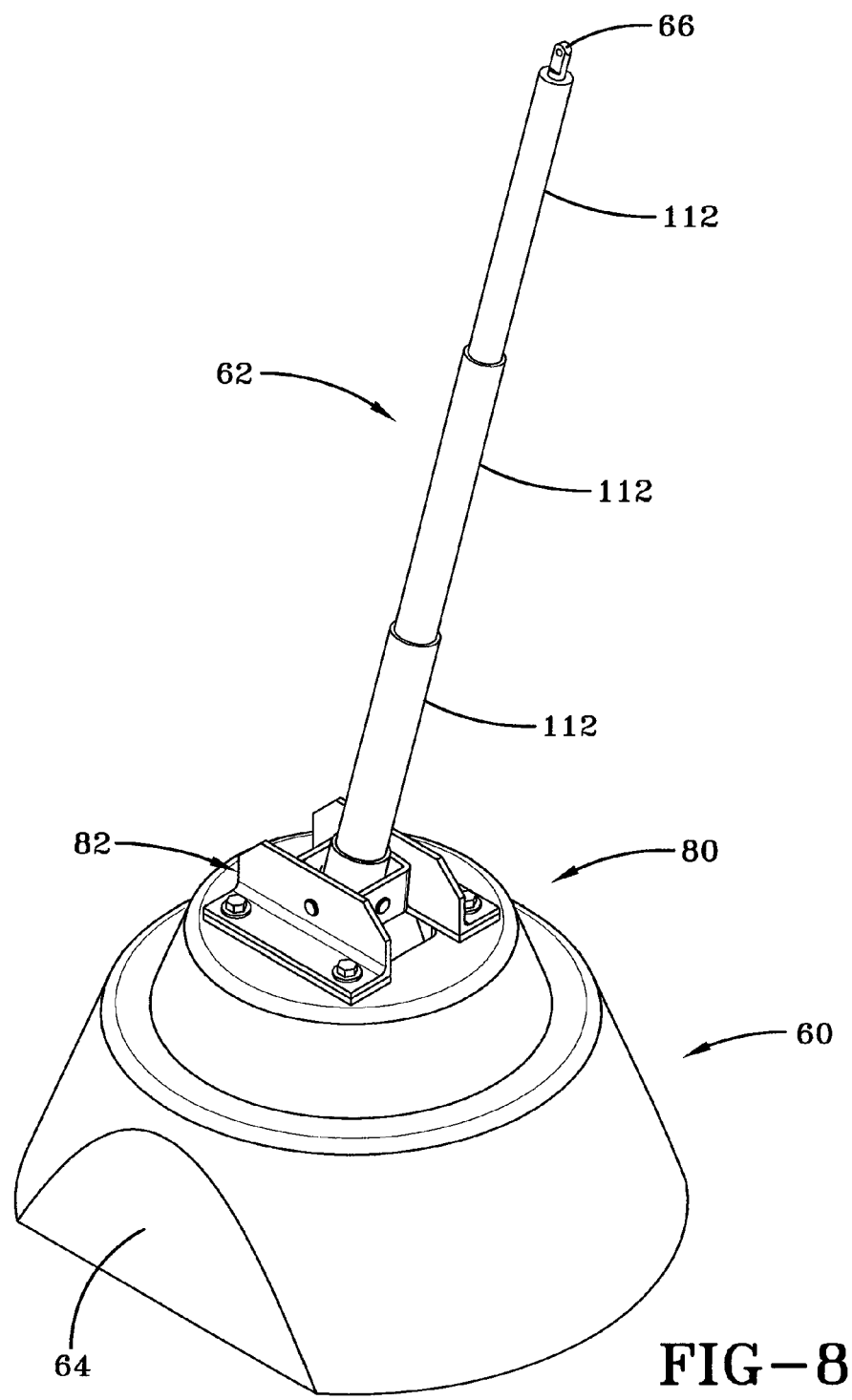
FIG. 8 is an elevation view of the trunnion mount showing the telescoping cylinder in an extended operational position.

FIGS. 6-8 depict a trunnion mount, designated generally by the numeral 80, that is secured and positioned onto the mounting surface 76. The trunnion mount 80 includes a pair of opposed flange brackets 82 which are mounted on either side of the opening 78. Each bracket includes a surface flange 84 that is bolted or otherwise secured to the mounting surface 76 and an extending flange 86 which extends substantially perpendicular from the surface flange 84. Each extending flange 86 includes a mounting hole 88. It will be appreciated that the mounting holes 88 are ideally aligned with one another on mirror image flange brackets.

A pivot bracket 90 is received between the opposed flange brackets 82. Each bracket 90 has pivot holes 94 aligned with one another and also aligned with the adjacent mounting holes 88. The pivot bracket 90 is provided with a base hole 98 which allows for receiving a fastener to secure the telescoping cylinder 62 at its trunnion mount. In other words, the base end 64 of the telescoping cylinder 62 is trunnion mounted through the pivot bracket 90 and the fixed flange brackets 82 to the ballast block 60. At the other end, the socket end of the telescoping cylinder 62 is mounted to the mounting sockets 54 of the wing flange 52. Skilled artisans will appreciate that the connections of the telescoping cylinder 66 to the ballast block and the solar array allow for the desired motions of the solar array between the retracted hurricane lay down position and the operational sun-tracking position, and the connections also allow for the tracking motion as the array assembly 22 follows the sun's trajectory. Accordingly, the trunnion mount allows the solar array 24 to rotate concentrically about the spine 26 axis and pivot in elevation about the axis defined by the two holes in the pivot end 28. The telescoping cylinder 62 comprises a plurality of telescoping sections 112 wherein hydraulic fluid or electrical actuators or other controllable mechanism allow for the sections 112 to be extended and retracted to either store the solar array 24, or track the sun.

Figure 10:
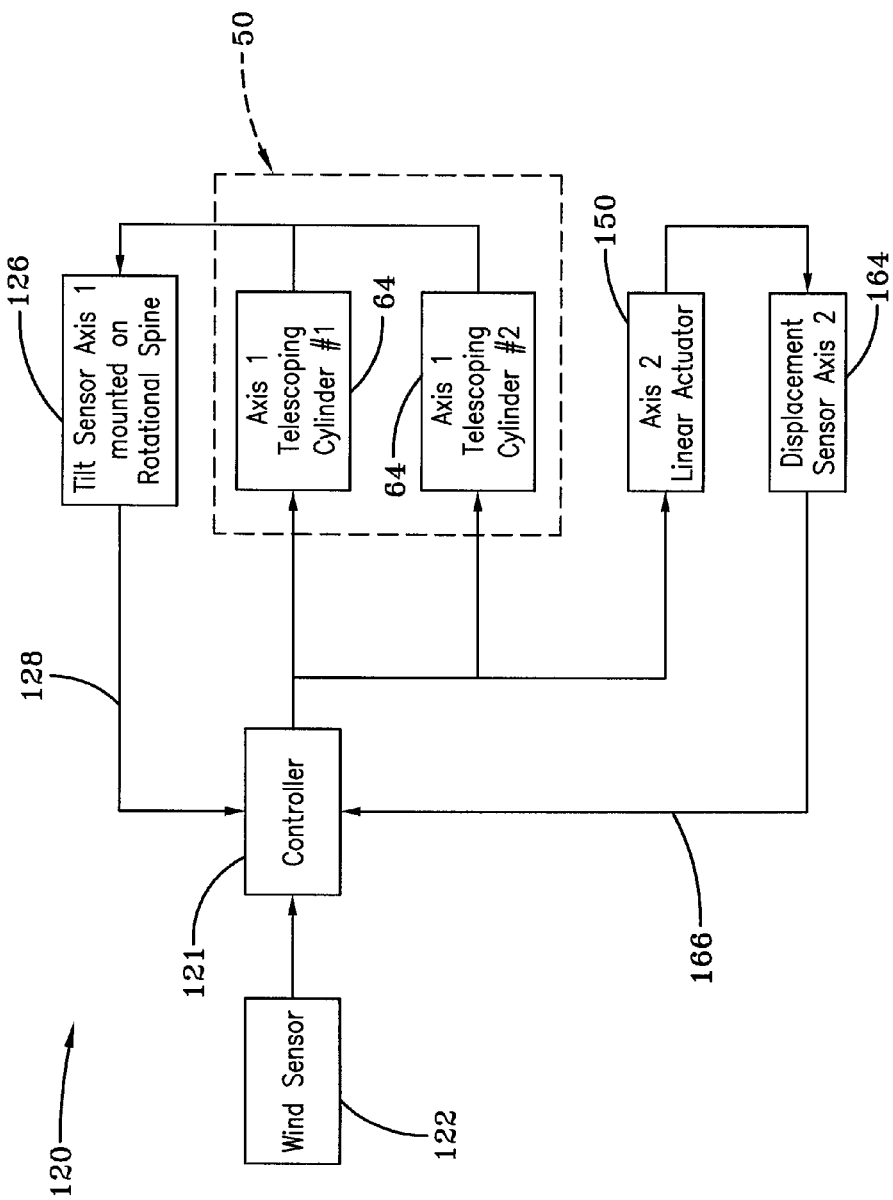
FIG. 10 is a schematic diagram of a control circuit used to operate the solar tracker according to the concepts of the present invention.

Referring now to FIG. 10, it can be seen that a tracker control system is designated generally by the numeral 120. The tracker control system 120 may be maintained at the control panel 46 or at a remote location where the various inputs are generated and outputs are monitored. In such an embodiment, the remote location is in communication with the control panel 46 and in turn with the components of the tracker 20. In any event, the tracker control system 120 facilitates movement of the solar panel array assembly 22 when it is in its operation position, and also facilitates retraction of the telescopic cylinders to a lay-down position when appropriate. It will further be appreciated that the control system 120 independently controls the telescopic cylinders so that one cylinder can be fully extended while the other cylinder is only partially extended so as to allow for controlled rotation of the spine into the appropriate sun-facing direction so as to maximize exposure of the solar panel array assembly to the sun. Controlled rotation of the spine is obtained by control of the telescoping cylinders. In other words, when the solar array moves into a lay down hurricane position, both telescoping cylinders move in the same direction and in unison. When the solar array is moving about one axis to follow the sun's trajectory, the telescoping cylinders move in opposite directions as appropriate.

The controller 121, which provides the necessary hardware, software and memory to implement the operational features of the tracker 20, generates the appropriate signals to control operation of the telescopic cylinders 62. A displacement or tilt sensor 126, which generates a sensor signal 128 is mounted anywhere on the spine 26 or elsewhere on the solar array 24 so as to provide for confirmation of the angular or tilt position of the array to the controller 121. The controller may then make adjustments to the operation of the telescopic cylinders to obtain the desired retracted and/or tilted position. A wind sensor 122 is also connected to the controller 121. It will be appreciated that the wind sensor may be mounted at the distal sensor end 30 of the spine 26 or in any other appropriate position on the solar panel assembly 22 so as to detect high wind conditions. In some embodiments, the wind sensor may be signals or data generated by a public weather service. It will further be appreciated that in some embodiments the wind sensor 122 may be located in other locations so as to provide for early detection of high wind conditions at a predetermined threshold. In any event, when the wind sensor 122 detects high wind conditions, the controller 121 may actuate telescopic cylinders 64 in such a manner so as to move the solar panel array assembly 22 to a lay-down position such that the surface of the panels are at least flush or positioned below the top edge of the berm B. When in such a lay-down position, it is believed that the high winds will be deflected by the berm so as to prevent horizontal debris or wind forces from impacting the solar panels. Alternatively, upon detected power loss or remote signal to the solar tracker, the hydraulic control system or the like maintained by the telescopic cylinders descends to a horizontal position using a gravity actuated hydraulic control valve to keep the solar array parallel to the ground as it descends to the lay flat position.

Figure 11:
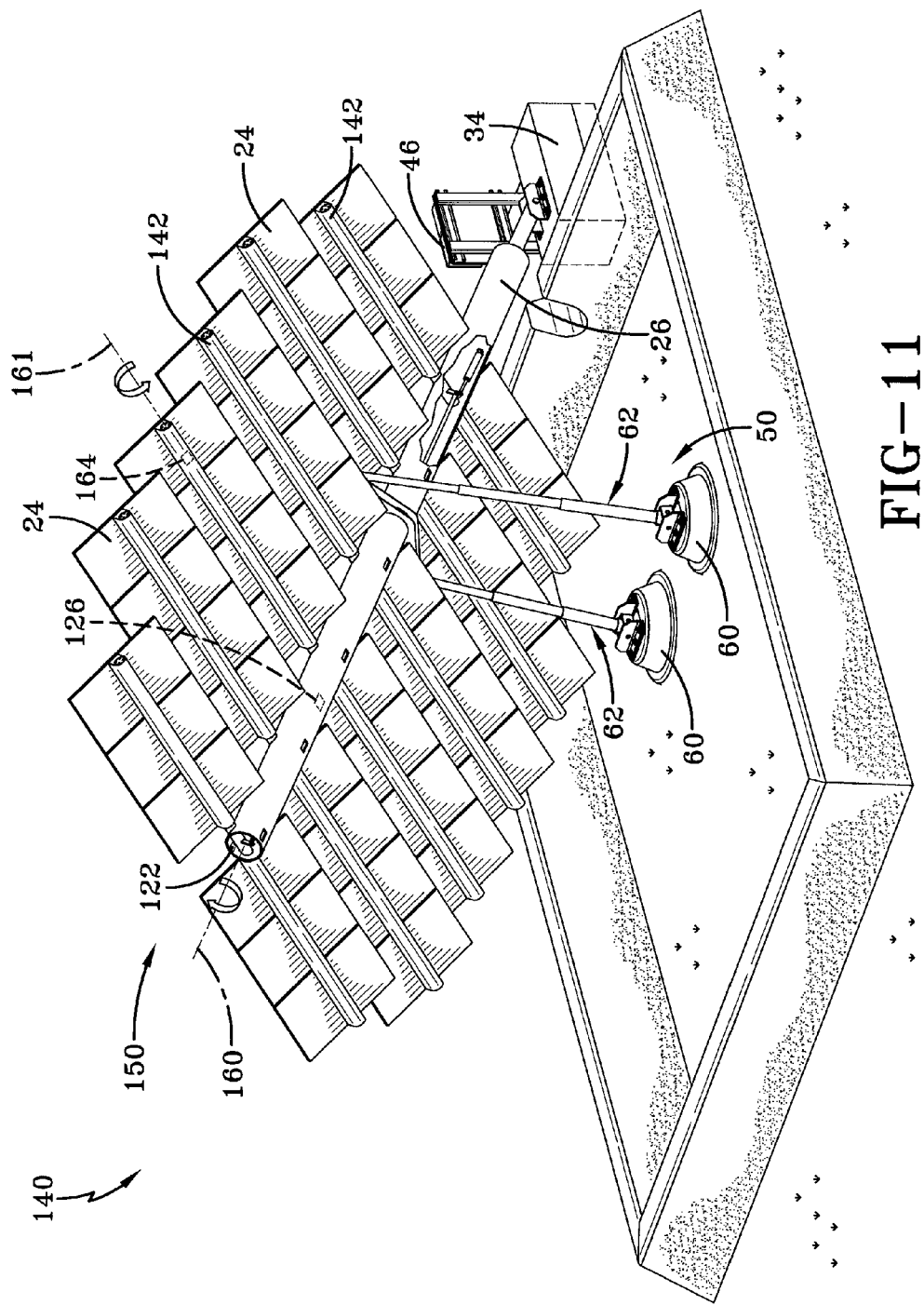
FIG. 11 is a perspective view of an alternative embodiment of a solar tracker which provides two axes of rotation according to the concepts of the present invention.
Figure 12:
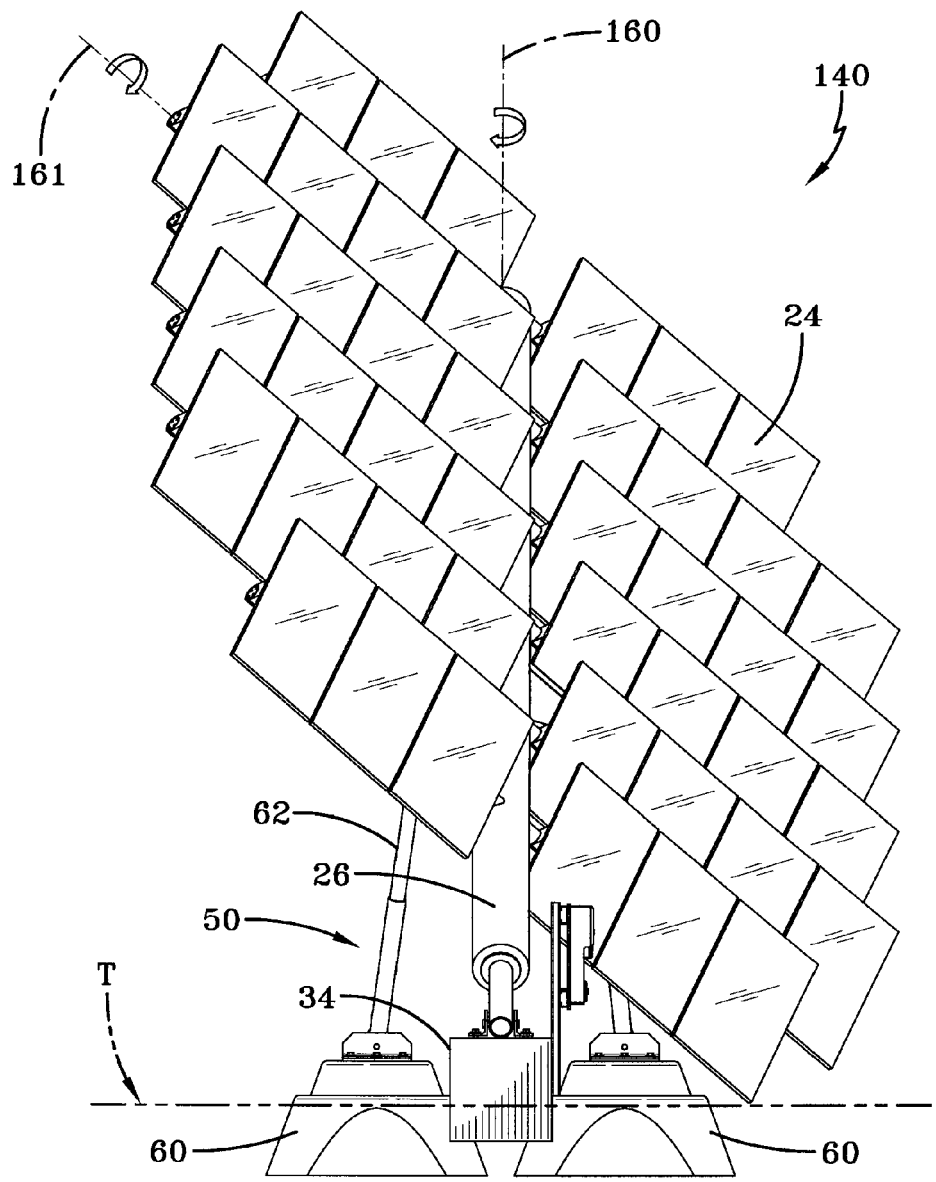
FIG. 12 is an elevation view of the two axis solar tracker according to the concepts of the present invention.
Figure 13:
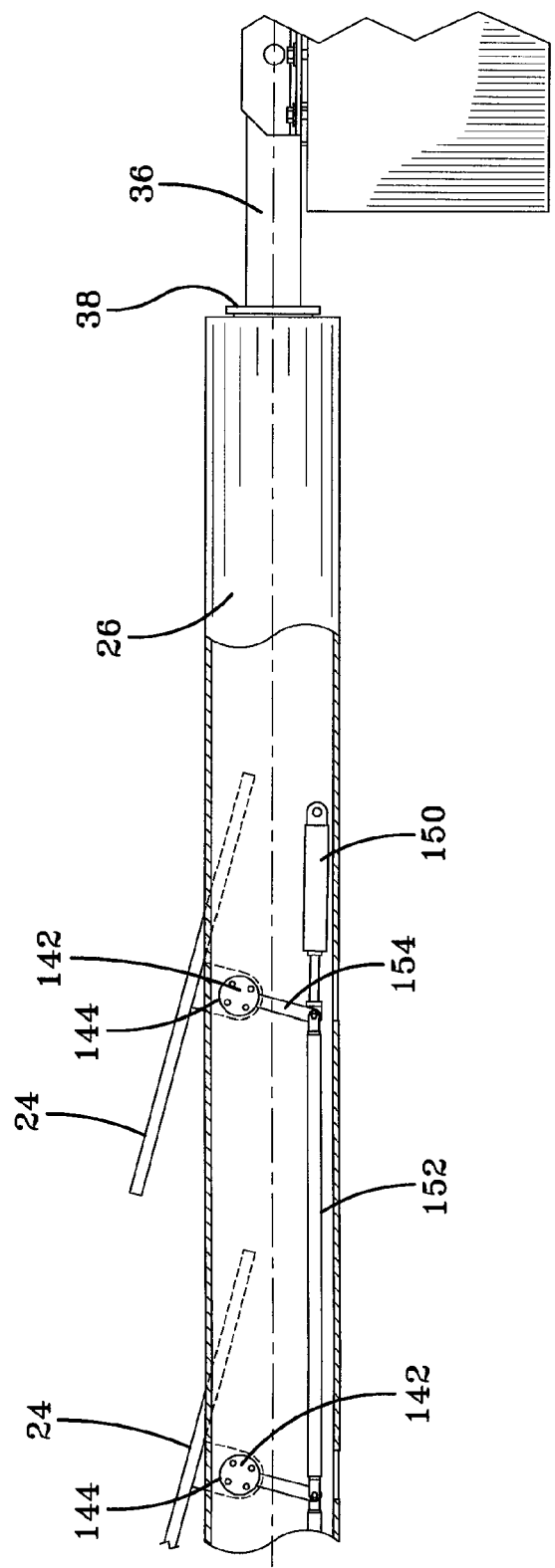
FIG. 13 is a partial cross sectional view showing mechanisms employed to move the solar panels along a second axis according to the concepts of the present invention.

Referring now to FIGS. 11-13, it can be seen that an alternative solar tracker is designated generally by the numeral 140. This two axis tracker 140 is similar to the single axis tracker 20 and the like components are designated with the same numeral. In this particular embodiment, the tracker 140 provides for two-axes tilting so as to allow for rotatable movement of a spine along a first axis of rotation 160 and also a second axis of rotation 161 of the solar panels. In particular, a plurality of array arms 142 extend radially from opposed sides of the spine 26 wherein each arm 142 supports at least one solar panel 24. Each arm 142 is provided with a bushing 144 so as to allow individual rotation of each arm. A linear actuator 150 is provided inside of the spine 26 wherein the linear actuator 150 is connected to at least one link arm 152, wherein each link arm is coupled to an array arm. Other linkage arrangements could be employed, such as outside of the spine, to enable movement of the linear actuator to control movement of the arms and, as a result, movement of the solar panels. It will further be appreciated that the linear actuator 150 is connected to the controller 121 and receives signals therefrom as shown in FIG. 10.

The link arms 152 are provided with a drive link 154 wherein one end of each drive link 154 is attached to the link arm and an opposite end of the link arm is attached to an underside or the appropriate rotatable feature of the corresponding array arm 142. Accordingly, movement of the linear actuator moves the link arm 152 which generates a corresponding movement in the drive links and, as such, tilting movement of the solar array panels along the second axis 161.

Each array arm may have a displacement or tilt sensor 164, which generates a sensor signal 166, that is mounted anywhere on the array arm 24 so as to provide an angular position of the corresponding array arm which in turn provides confirmation of the angular or tilt position of array arms about axis 161 and associated solar panels to the controller 121.

From the foregoing description of the two axis tracker 140 it will be appreciated that the utilization of the tracking structure and drive system associated with the control circuit allows for a two axis tracker to generate up to forty percent more energy than typically generated by fixed solar panels. Moreover, the configuration also allows for storing the solar panels horizontally close to the ground in a cost effective manner so as to avoid high winds and exposure to flying horizontal debris.

Figure 14:
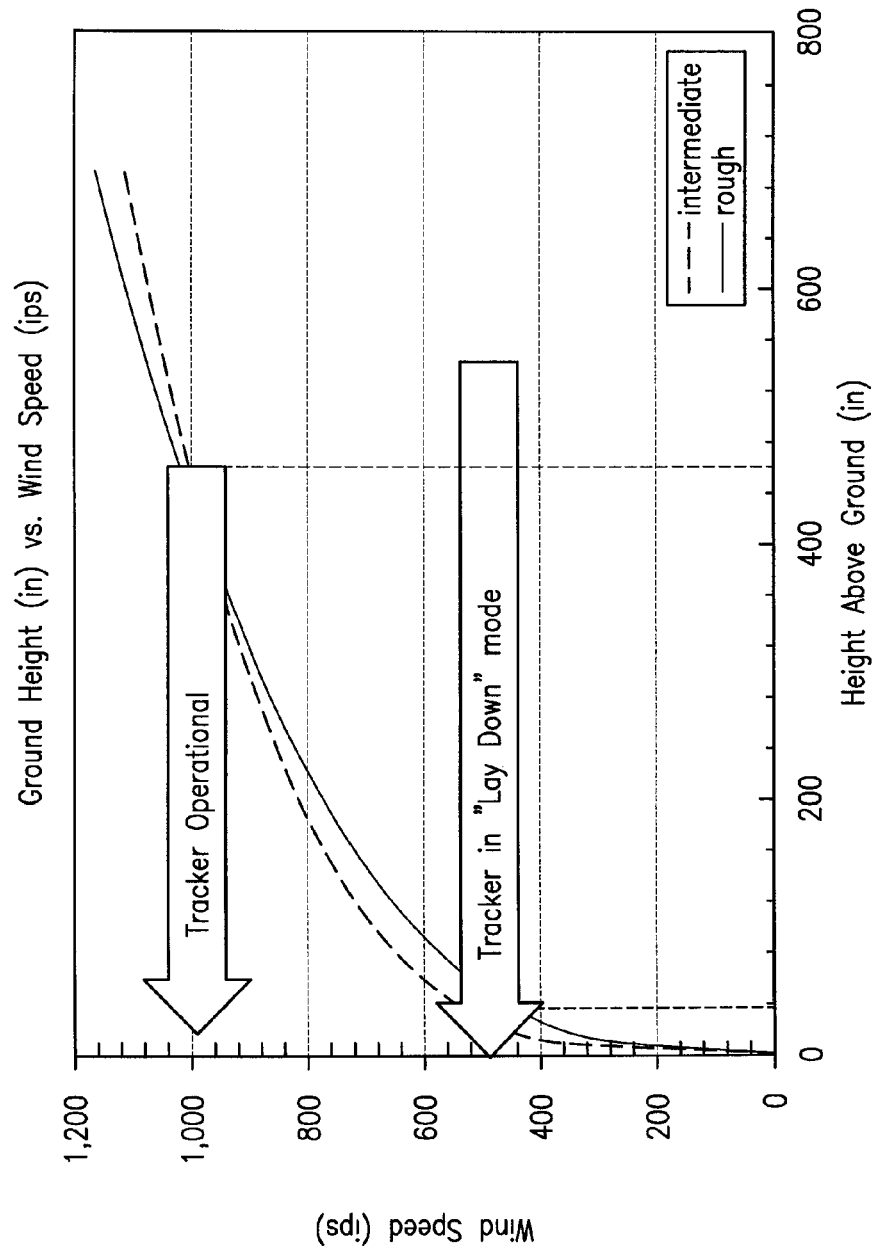
FIG. 14 is a graphical representation of ground height of the solar tracker in comparison to wind speed.

FIG. 14 shows a graphical representation of ground height versus wind speed. As such, the solar tracker will see one quarter of the wind force since the force of wind is proportional to the wind speed squared. Thus, by moving the tracker to a lay-down mode (about 40 inches above the ground), the exposure to wind speed is significantly reduced as compared to when the tracker is in an operational mode with its position approximately 400 to 600 inches above the ground. In the operational mode it can be seen that the wind force is significantly higher and, as such, prone to damage.

Figure 15:
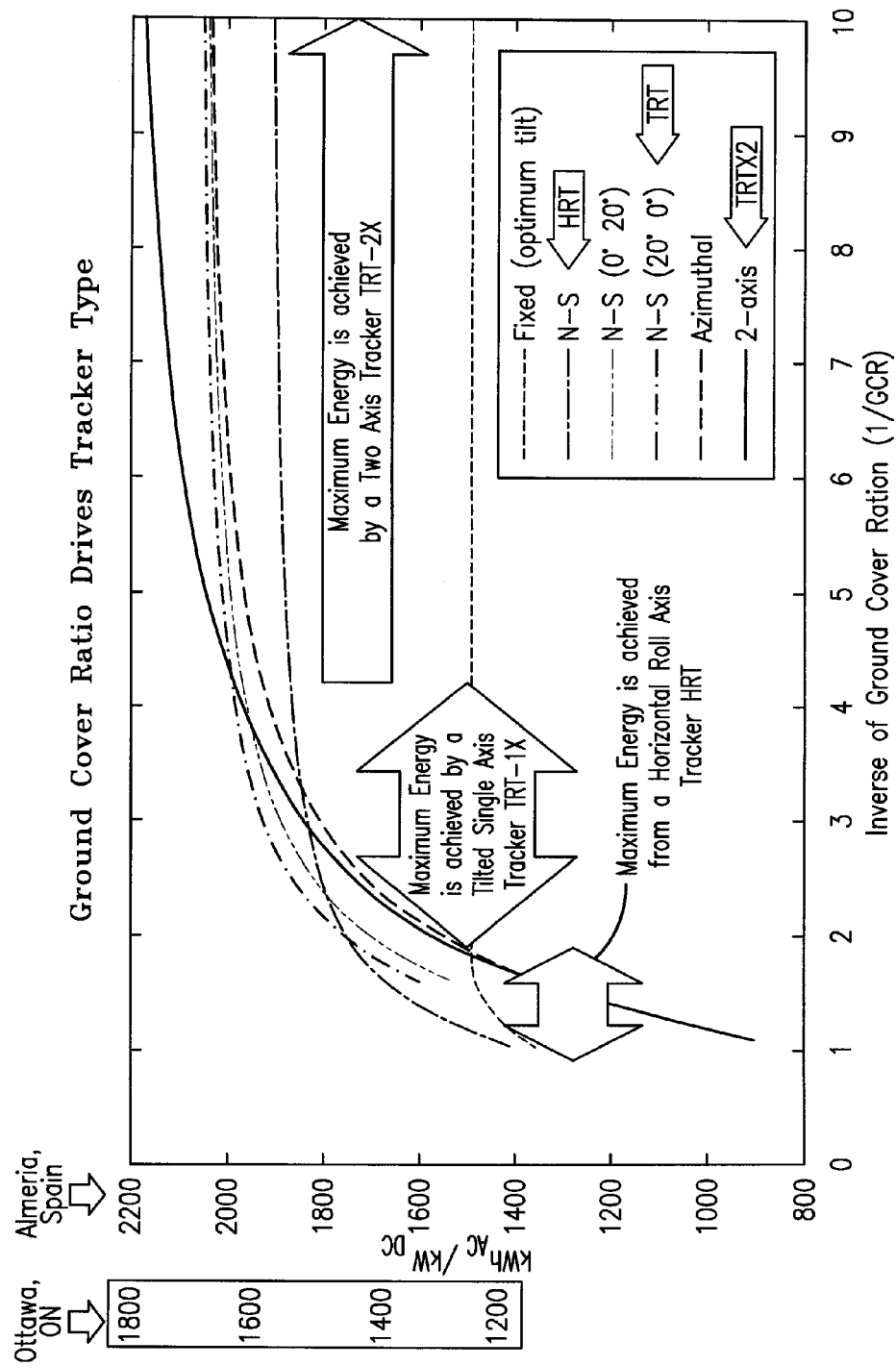
FIG. 15 is a graphical representation showing how the ground cover ratio drives the selection of a solar tracker system.

Referring now to FIG. 15, it can be seen that three different areas of maximum energy production can be provided by utilizing a single axis or dual axis tracker configuration. From the criteria provided it can be seen that by comparing specific energy production with the inverse of the ground cover ratio that an optimal performance can be obtained with a Horizontal Roll Tracker (HRT) if the ground cover ratio is between ninety and fifty percent in the first area. The HRT is thus optimal for areas requiring high power density but minimal wind occurrences. However, if a ground cover ratio is between fifty percent and twenty two percent, then it is believed that the tilted single axis tracker system provides for optimal energy generation. However, if the land available results in a ground cover ratio of less than twenty two percent, then the two-axis tracker provides the best energy performance.

The advantages of the present invention are readily apparent. A three-point tilt axis solar tracker structure as shown and described, provides a narrow end of the solar panel array mounted to the ground that is pivotably fixed to the ground while the other end of the array is supported by telescoping cylinders. Differential extension of the telescopic cylinders may track the sun east to west on a tilted axis inclined to the horizontal by about twenty to forty five degrees and aligned on a north-south axis with the north end of the array raised above the south ground mounted end of the array. In the event of high winds as detected by the wind sensor 122 or power loss, the cylinders may retract thereby lowering the array flush to the ground or flush to the slightly raised berms surrounding the plan area of the array. In the storage position, the solar panels are hidden from the pressure of the wind and aligned parallel to the ground, thus minimizing the structural mounting strength required and possibility of damage to the solar panels. By utilizing such a configuration, the need for strengthened mounting configurations of the solar panel arrays is eliminated. Moreover, utilization of the sensors can automatically move the panels of both embodiments to a lay-down position and the control system can be configured such that the loss of power will also cause the solar panels of both embodiments to revert to a lay-down position under no power. The described configuration is advantageous in that the anchoring and storing systems save costs since the actuators are performing three functions—tracking, storing and anchoring.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A hurricane-proof solar tracker, comprising:
    a solar panel array assembly comprising:
        a spine having a longitudinal axis and an end coupled to a first ballast block, the spine being rotatable about the longitudinal axis, the first ballast block configured to be anchored to a terrain; and
        a plurality of solar panels;
    a tilting assembly supporting said solar panel array assembly, said tilting assembly comprising:
        a wing flange coupled to said spine, said wing flange having a pair of mounting sockets;
        a pair of trunnion mounts; and
        a pair of actuatable telescoping cylinders, wherein each actuatable telescoping cylinder of the pair of actuatable telescoping cylinders is pivotally coupled with respect to a corresponding trunnion mount of the pair of trunnion mounts, and coupled to a corresponding mounting socket of the pair of mounting sockets of the wing flange;
    a controller coupled to the tilting assembly, the controller configured to:
        actuate the pair of actuatable telescoping cylinders to rotate the spine in an operational mode;
        actuate the pair of actuatable telescoping cylinders to retract to a lay-down position in a lay-down mode; and
    a pair of second ballast blocks, each trunnion mount of the pair of trunnion mounts coupled to a corresponding second ballast block of the pair of second ballast blocks, each second ballast block forming a cavity, the cavity configured to receive at least a portion of a corresponding actuatable telescoping cylinder in the lay-down mode.

2. The tracker according to claim 1, further comprising:
    a plurality of array arms extending from said spine, each said array arm carrying at least one solar panel, said plurality of array arms rotatable with respect to said spine;
    a link arm coupled to the plurality of array arms; and
    a linear actuator coupled to said link arm to rotate the plurality of array arms and thereby move all said solar panels to provide a two axis tracker.

3. The tracker according to claim 1, further comprising:
    a wind sensor connected to said controller, said wind sensor generating a high wind signal when wind reaches a predetermined level that is received by said controller which moves said solar panel array assembly to said lay-down position.

4. The tracker according to claim 1, wherein said controller, upon detection of a power loss, is configured to actuate the pair of actuatable telescoping cylinders to retract to the lay-down position.

5. The tracker according to claim 1, further comprising:
    a berm constructed around a periphery of said solar panel array assembly such that when said solar panel array assembly is in said lay-down position, said solar panel array assembly is flush with or below a top edge of said berm.

6. The solar tracker of claim 1, where each second ballast block is configured to be anchored to the terrain.

7. The solar tracker of claim 1, wherein the spine further comprises a shaft, the shaft coupled to the first ballast block and being at least partially rotatable about the first ballast block.

8. The solar tracker of claim 1, wherein to actuate the pair of actuatable telescoping cylinders to rotate the spine in the operational mode the controller is further configured to actuate one telescoping cylinder of the pair of actuatable telescoping cylinders to extend and another telescoping cylinder of the pair of actuatable telescoping cylinders to partially retract.

* * * * *